(12) United States Patent
Asakawa et al.

(10) Patent No.: US 11,454,489 B2
(45) Date of Patent: Sep. 27, 2022

(54) SENSOR MODULE WITH REDUCED SIZE (71) Applicant: MINEBEA MITSUMI Inc., Nagano (JP)

(72) Inventors: Toshiaki Asakawa, Shizuoka (JP); Shigeyuki Adachi, Shizuoka (JP)

(73) Assignee: MINEBEA MITSUMI Inc., Nagano (JP)

( * ) Notice: Subject to any disclaimer, the term of this patent is extended or adjusted under 35 U.S.C. 154(b) by 59 days.

(21) Appl. No.: 16/963,297

(22) PCT Filed: Jan. 17, 2019

(86) PCT No.: PCT/JP2019/001263
§ 371 (c)(1),
(2) Date: Jul. 20, 2020

(87) PCT Pub. No.: WO2019/142860
PCT Pub. Date: Jul. 25, 2019

(65) Prior Publication Data
US 2021/0055095 A1    Feb. 25, 2021

(30) Foreign Application Priority Data
Jan. 22, 2018 (JP) .............................. JP2018-008379

(51) Int. Cl.
*G01B 7/16* (2006.01)
*C22C 38/40* (2006.01)
*G01L 1/22* (2006.01)

(52) U.S. Cl.
CPC ................ *G01B 7/18* (2013.01); *C22C 38/40* (2013.01); *G01L 1/2293* (2013.01)

(58) Field of Classification Search
None
See application file for complete search history.

(56) References Cited

U.S. PATENT DOCUMENTS

| | | |
|---|---|---|
| 5,914,168 A | 6/1999 | Wakamatsu et al. |
| 7,055,365 B2 | 6/2006 | Yanagi |
| 9,627,605 B2 | 4/2017 | Ando et al. |
| 10,339,432 B2 | 7/2019 | Yamada et al. |
| 2004/0027819 A1 | 2/2004 | Berberich |

(Continued)

FOREIGN PATENT DOCUMENTS

| | | |
|---|---|---|
| EP | 725392 | 8/1996 |
| JP | H06-300649 | 10/1994 |
| JP | H06-307950 | 11/1994 |

(Continued)

OTHER PUBLICATIONS

International Search Report for PCT/JP2019/001263 dated Mar. 12, 2019.

(Continued)

*Primary Examiner* — Lisa M Caputo
*Assistant Examiner* — Nigel H Plumb
(74) *Attorney, Agent, or Firm* — IPUSA, PLLC (57) ABSTRACT

A sensor module includes a substrate; a resistor formed of a-film containing Cr, CrN, and Cr2N, on one surface of the substrate; an electronic component mounted on the one surface of the substrate, to be electrically connected to the resistor; and a power source mounted on the one surface of the substrate or on another surface of the substrate, to be electrically connected to the electronic component, to supply power to the electronic component.

15 Claims, 9 Drawing Sheets

(56) References Cited

U.S. PATENT DOCUMENTS

2005/0188769 A1   9/2005   Moelkner et al.

FOREIGN PATENT DOCUMENTS

| | | |
|---|---|---|
| JP | H08-102163 | 4/1996 |
| JP | H09-016941 | 1/1997 |
| JP | H10-270201 | 10/1998 |
| JP | 2001-338382 | 12/2001 |
| JP | 2004-205410 | 7/2004 |
| JP | 2007-173544 | 7/2007 |
| JP | 2008-209368 | 9/2008 |
| JP | 2015-031633 | 2/2015 |
| JP | 2015-057598 | 3/2015 |
| JP | 2016-074934 | 5/2016 |
| JP | 2016-136605 | 7/2016 |
| WO | 2017/013940 | 1/2017 |
| WO | 2017/183384 | 10/2017 |

OTHER PUBLICATIONS

Office Action dated Feb. 22, 2022 with respect to the corresponding Japanese patent application No. 2018-008379.
Office Action dated Nov. 26, 2021 with respect to the corresponding Chinese patent application No. 201980020106.9.

SENSOR MODULE WITH REDUCED SIZE

TECHNICAL FIELD

The present invention relates to a sensor module.

BACKGROUND ART

Strain gauges that have been known are attached to an object to be measured so as to detect a strain of the object. Such a strain gauge includes a resistor for detecting a strain, and as materials of the resistor, materials containing, for example, Cr (chromium) and/or Ni (nickel) are used. Also, for example, both ends of the resistor are used as electrodes, and a lead wire or the like for external connection is joined to each electrode by solder, so that a signal can be input and output to and from an electronic component (see, e.g., Patent Document 1).

RELATED-ART DOCUMENTS

Patent Document

[Patent Document 1] Japanese Unexamined Patent Application Publication No. 2016-74934

SUMMARY OF THE INVENTION

Problem to be Solved by the Invention

Conventionally, an electronic component connected to a resistor of a strain gauge and/or a power source supplying power to the electronic component have been provided outside the strain gauge to form a sensor module. Therefore, it has been difficult to make the sensor module smaller.

The present invention has been made in view of the above point, and has an object to make a sensor module smaller.

Means for Solving the Problem

According to an embodiment of the present invention, a sensor module includes a substrate; a resistor formed of a material containing at least one of chromium and nickel, on one surface of the substrate; an electronic component mounted on the one surface of the substrate, to be electrically connected to the resistor; and a power source mounted on the one surface of the substrate or on another surface of the substrate, to be electrically connected to the electronic component, to supply power to the electronic component.

Advantage of the Invention

According to the disclosed techniques, it is possible to make a sensor module smaller.

DETAILED DESCRIPTION OF THE PREFERRED EMBODIMENTS

In the following, embodiments for carrying out the present invention will be described with reference to the drawings. Throughout the drawings, the same elements are assigned the same reference numerals, and duplicate description may be omitted.

First Embodiment

Figure 1:
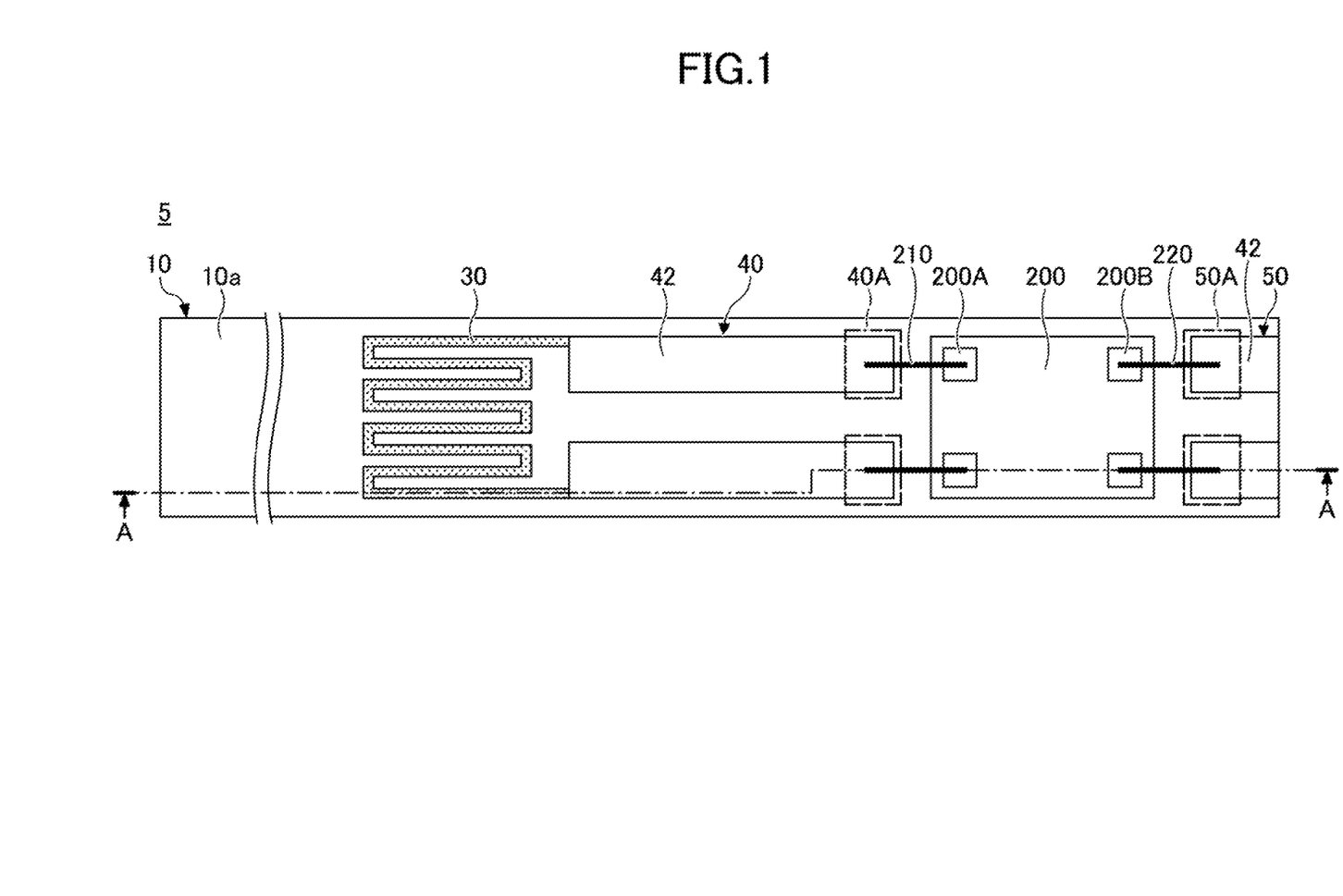
FIG. 1 is a partial plan view illustrating a sensor module according to a first embodiment.
Figure 2:
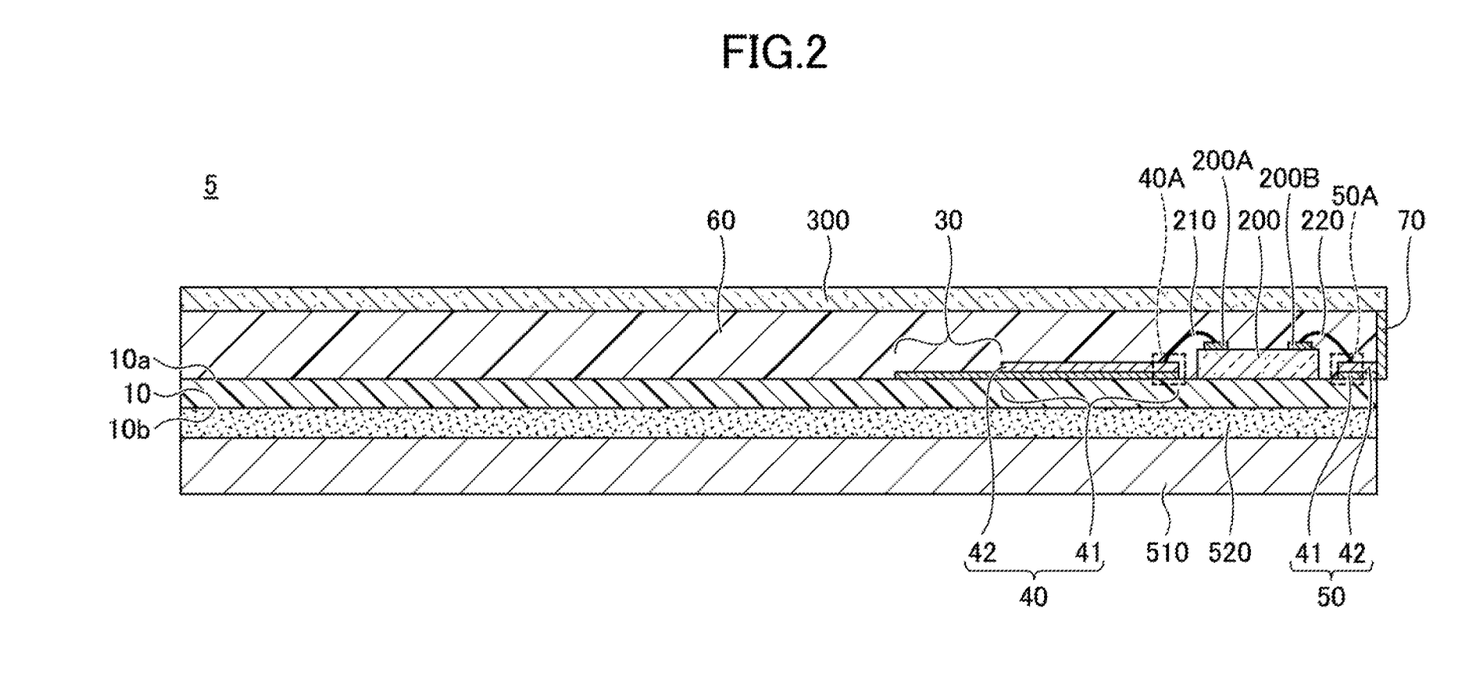
FIG. 2 is a first cross-sectional view illustrating a sensor module according to the first embodiment.

FIG. 1 is a partial plan view illustrating a sensor module according to a first embodiment. FIG. 1 is an enlarged view of the vicinity of an electronic component 200 and a resistor 30 in FIG. 2, in which illustration of a cover layer 60, wiring patterns 70, and a solar battery 300 is omitted. FIG. 2 is a cross-sectional view illustrating a sensor module according to the first embodiment, which illustrates a cross section taken along a line AA in FIG. 1.

Referring to FIGS. 1 and 2, a sensor module 5 includes a substrate 10, a resistor 30, wiring patterns 40, and electrodes 40A, an electronic component 200, metal wires 210 and 220, wiring patterns 50, electrodes 50A, a cover layer 60, wiring patterns 70, a solar battery 300, a strain generator 510, and an adhesive layer 520. In the sensor module 5, parts including the substrate 10, the resistor 30, the wiring patterns 40, and the electrodes 40A constitute a strain gauge.

Note that in the present embodiment, for the sake of convenience, a side of the sensor module 5 on which the resistor 30 of the substrate 10 is provided is defined as an upper side or one side, and another side on which the resistor 30 is not provided is defined as a lower side or the other side. Also, a surface of each part on which the resistor 30 is provided is defined as one surface or upper surface, and another surface on which the resistor 30 is not provided is defined as the other surface or lower surface. However, the sensor module 5 can be used upside down, or can be arranged at any angle. Also, a plan view refers to viewing an object from the normal direction of the upper surface 10a of the substrate 10, and a planar shape refers to a shape of an object viewed from the normal direction of the upper surface 10a of the substrate 10.

The substrate 10 is a member serving as a base layer for forming the resistor 30 and the like, and has flexibility. The thickness of the substrate 10 is not limited in particular and can be selected appropriately depending on the purpose; for example, the thickness can be approximately 5 μm to 500 μm. Especially, it is favorable that the thickness of the substrate 10 is between 5 μm and 200 μm from the viewpoint of the transmission of strain from the surface of the strain generator 510 joined to the lower surface 10b of the substrate 10 via an adhesive layer 520, and the dimensional stability with respect to the environment; and it is more favorable that the thickness is greater than or equal to 10 μm from the viewpoint of insulation.

The substrate 10 can be formed from an insulating resin film, for example, PI (polyimide) resin, epoxy resin, PEEK (polyether ether ketone) resin, PEN (polyethylene naphthalate) resin, PET (polyethylene terephthalate) resin, PPS (polyphenylene sulfide) resin, polyolefin resin, or the like. Note that a film refers to a member having a thickness of approximately less than or equal to 500 μm and having flexibility.

Here, "formed from an insulating resin film" does not preclude a substrate 10 from containing fillers, impurities, and the like in the insulating resin film. The substrate 10 may be formed from, for example, an insulating resin film containing a filler such as silica or alumina.

However, in the case where the substrate 10 does not need to have flexibility, materials such as $SiO_2$, $ZrO_2$ (including YSZ), Si, $Si_2N_3$, $Al_2O_3$ (including sapphire), ZnO, perovskite-based ceramics ($CaTiO_3$ or $BaTiO_3$), or the like may be used for the substrate 10.

The resistor 30 is a thin film formed on the substrate 10 to have a predetermined pattern, which is a sensing part in which a resistance change is generated in response to a strain. The resistor 30 may be formed directly on the upper surface 10a of the substrate 10, or may be formed on the upper surface 10a of the substrate 10 via another layer. Note that in FIG. 1, the resistor 30 is illustrated in a dot pattern for the sake of convenience.

The resistor 30 can be formed from, for example, a material containing Cr (chromium), a material containing Ni (nickel), or a material containing both Cr and Ni. In other words, the resistor 30 can be formed from a material containing at least one of Cr and Mi. As an example of the material containing Cr, for example, a Cr composite film may be cited. As an example of the material containing Ni, for example, Cu—Ni (copper-nickel) may be cited. As a material containing both Cr and Mi, for example, Ni—Cr (nickel-chrome) may be cited.

Here, the Cr composite film is a film in which Cr, CrN, $Cr_2N$, and the like are mixed. The Cr composite film may contain unavoidable impurities such as chromium oxide.

The thickness of the resistor 30 is not limited in particular and can be selected appropriately depending on the purpose; for example, the thickness can be approximately 0.05 μm to 2 μm. Especially, it is favorable that the thickness of the resistor 30 is greater than or equal to 0.1 μm because the crystallinity of crystals constituting the resistor 30 (e.g., the crystallinity of α-Cr) improves, and it is further favorable that the thickness is less than or equal to 1 μm because cracks in the film and/or the warp from the substrate 10 due to the internal stress of the film constituting the resistor 30 can be reduced.

For example, in the case of the resistor 30 being a Cr composite film, the stability of the gauge characteristics can be improved by using α-Cr (alpha chromium), which is a stable crystal phase, as the main component. Also, by having the resistor 30 mainly constituted with α-Cr, the gauge factor of a strain gauge the sensor module 5 can be greater than or equal to 10, and the temperature coefficient of gauge factor TCS and the temperature coefficient of resistance TCR can be fallen within a range of −1000 ppm/° C. to +1000 ppm/° C. Here, the main component means that a substance accounts for greater than or equal to 50 mass % among all substances constituting the resistor; from the viewpoint of improving the gauge characteristics, it is favorable that, the resistor 30 contains α-Cr by greater than or equal to 80 wt %. Note that α-Cr is Cr having a bcc structure (body-centered cubic lattice structure).

The wiring patterns 40 are a pair of wiring patterns electrically connected to both ends of the resistor 30. The wiring patterns 40 include a first layer 41, and a second layer 42 layered on the first layer 41. The first layer 41 extends from both ends of the resistor 30, and is formed in a substantially rectangular shape having a wider width than the resistor 30 in plan view. The second layer 42 is layered on the upper surface of the first layer 41. The resistor 30 extends, for example, in a zigzag way from one of the wiring patterns 40 and is connected to the other of the wiring patterns 40. The wiring pattern 40 is not limited to a linear shape, and may have any pattern. Also, the wiring pattern 40 can have any width and any length.

Each electrode 40A is electrically connected to a corresponding wiring pattern 40. The electrodes 40A are a pair of electrodes for outputting a change in the resistance value of the resistor 30 caused by a strain, and can be electrically connected to an electronic component 200. The electrode 40A may be formed to have a width different from that of the wiring pattern 40.

Note that although different numerals are used for the resistor 30 and the first layer 41 for the sake of convenience, these may be integrally formed of the same material in the same process.

The second layer 42 has a lower resistance than the first layer 41. The material of the second layer 42 is not limited in particular and may be appropriately selected depending on the purpose as long as the material has a lower resistance than the first layer 41; for example, Cu, a Cu alloy, Ni, or a Ni alloy may be used. The thickness of the second layer 42 may be, for example, approximately 0.5 μm to 30 μm.

The second layer 42 may be a layered film. As the layered film, Cu/Ni/Au, Cu/NiP/Au, Cu/Pd/Au, Cu/Pt/Au, Ni/Au, NiP/Au, and the like may be listed. Note that "AA/BB" means a layered film in which an AA layer and a BB layer are layered in this order on the upper surface of an underlying layer (the same applies to a case of three layers or more). In these layered films, a Cu alloy may be used Instead of Cu, and a Ni alloy may be used instead of Ni.

Note that although different numerals are used for the wiring pattern 40 and the electrode 40A for the sake of convenience, these may be integrally formed of the same material in the same process. However, the layer configuration of the electrode 40A may be different from the layer configuration of the wiring pattern 40. For example, Au or the like may be formed only on the uppermost layer of the electrode 40A to improve the connection reliability.

In this way, by selecting the material of the second layer 42, it is possible to improve the connection reliability with an electronic component without depending on the materiel of the first layer 41 which is the same material as the resistor 30.

The electronic component 200 is mounted on the upper surface 10a of the substrate 10, for example, via an adhesive layer such as a die-attach film. The electronic component 200 is, for example, a semiconductor chip that performs amplification of an electric signal input from the resistor 30 via the wiring patterns 40 and the electrodes 40A, and temperature correction. A passive component such as a capacitor may be mounted together with the semiconductor chip.

Also, the electronic component 200 may be flip-chip mounted on the upper surface 10a of the substrate 10. In this case, the layout of the wiring patterns 40 is changed so that the electrodes 40A are arranged on the lower surface of the electronic component 200, and the electrodes 40A and electrodes 200A of the electronic component 200 formed on the lower surface of the electronic component 200 may be connected using solder balls or the like.

Note that external input/output terminals can be provided at any position on the upper surface 10a of the substrate 10, which can be electrically connected to an electronic component 200, and allows signals inputting and outputting to and from an external circuit electrically connected to the sensor module 5.

The electronic component 200 includes the electrodes 200A connected to the resistor 30 and the electrodes 200B through which the power is supplied. Each electrode 200A of the electronic component 200 is electrically connected to a corresponding electrode 40A via the metal wire 210 such as a gold wire or a copper wire. The electrodes 200A and the electrodes 40A can be connected by, for example, wire bonding.

Each electrode 200B of the electronic component 200 is electrically connected to a corresponding electrode 50A via the metal wire 220 such as a gold wire or a copper wire. The electrodes 200B and the electrodes 50A can be connected by, for example, wire bonding. The wiring patterns 50 are connected to the electrodes 50A. Like the wiring patterns 40, the wiring patterns 50 include a first layer 41, and a second layer 42 layered on the first layer 41. The wiring pattern 50 is not limited to a linear shape, and may have any pattern. Also, the wiring pattern 50 can have any width and any length.

The cover layer 60 is an insulating resin layer provided on the upper surface 10a of the substrate 10, so as to cover the resistor 30, the wiring patterns 40, the electrodes 40A, the electronic component 200, the metal wires 210 and 220, the electrodes 50A, and the wiring patterns 50. However, the ends of the wiring patterns 50 on the opposite side with respect to the electrodes 50A are exposed out of the cover layer 60.

By providing the cover layer 60, it is possible to prevent mechanical damage and the like from occurring in the resistor 30, the wiring patterns 40, the electrodes 40A, the electronic component 200, the metal wires 210 and 220, the electrodes 50A, and the wiring patterns 50. Also, by providing the cover layer 60, it is possible to protect the resistor 30, the wiring patterns 40, the electrodes 40A, the electronic component 200, the metal wires 210 and 220, the electrodes 50A, and the wiring patterns 50 from moisture and the like.

The cover layer 60 can be formed from an insulating resin; for example, PI resin, epoxy resin, PEEK resin, PEN resin, PET resin, PPS resin, composite resin (e.g., silicone resin, polyolefin resin), or the like. The cover layer 60 may contain a filler or a pigment. The thickness of the cover layer 60 is not limited in particular and can be selected appropriately depending on the purpose; for example, the thickness can be approximately 2 µm to 30 µm.

The solar battery 300 is mounted on the upper surface 10a of the substrate 10. Specifically, the solar battery 300 is arranged on the upper surface of the cover layer 60, and electrically connected to the wiring patterns 50 via the wiring patterns 70 provided on the side surface of the cover layer 60.

In other words, the solar battery 300 is electrically connected to the electrodes 200B of the electronic component 200 via the wiring patterns 70, the wiring patterns 50, the electrodes 50A, and the metal wires 220, to function us a power source that supplies power to the electronic component 200.

The solar battery 300 is a flexible solar battery made of, for example, an amorphous-silicon, silicon-crystal, or compound (e.g., CIGS) material laminated on the cover layer 60. Note that CIGS is a compound solar battery that contains copper (Cu), indium (In), gallium (Ga), and selenium (Se) as the main components.

Note that the method of connecting the solar battery 300 to the wiring patterns 50 is not limited in particular. For example, instead of the wiring patterns 70 provided on the side surface of the cover layer 60, through-hole wirings may be provided through the cover layer 60, to connect the solar battery 300 to the wiring patterns 50 via the through-hole wirings. Alternatively, the end of the flexible substrate constituting the solar battery 300 may be extended along the side surface of the cover layer 60, to connect to the wiring patterns 50. Alternatively, the solar battery 300 and the wiring patterns 50 may be connected using wires.

The strain generator 510 is fixed to the lower surface 10b of the substrate 10 via the adhesive layer 520. The strain generator 510 is, for example, an object formed from a metal such as Fe, SUS (stainless steel), or Al; or a resin such as PEEK, and deforms (generates a strain) in response to an applied force. The sensor module 5 can detect a strain generated in the strain generator 510 as a change in the resistance of the resistor 30.

The material of the adhesive layer 520 is not limited in particular, and can be appropriately selected depending on the purpose as long as having a function of adhering the substrate 10 to the strain generator 510; for example, an epoxy resin, modified epoxy resin, silicone resin, modified silicone resin, urethane resin, modified urethane resin, or the like can be used. Also, a material such as a bonding sheet may be used. The thickness of the adhesive layer 520 is not limited in particular and can be selected appropriately depending on the purpose; for example, the thickness can be approximately 0.1 µm to 50 µm.

In order to manufacture a sensor module 5, first, a substrate 10 is prepared, and a planar resistor 30 and a first, layer 41 as illustrated in FIG. 1 are formed on the upper surface 10a of the substrate 10. The material and thickness of the resistor 30 and the first layer 41 are as described above. The resistor 30 and the first layer 41 can be integrally formed of the same material.

The resistor 30 and the first layer 41 can be formed by, for example, forming a film by a magnetron sputtering method using a material capable of forming the resistor 30 and the first layer 41 as a target, and patterning the film by photolithography. The resistor 30 and the first layer 41 may be formed using a reactive sputtering method, an evaporation method, an arc ion plating method, a pulse laser deposition method, or the like instead of the magnetron sputtering method.

From the viewpoint of stabilizing the gauge characteristics, before forming the resistor 30 and the first layer 41 as a film, as an underlayer, it is favorable to form in vacuum a functional layer as a film having a thickness of approximately 3 nm to 100 nm on the upper surface 10a of the substrate 10 by, for example, a conventional sputtering method. Note that after having the resistor 30 and the first layer 41 formed on the entire upper surface of the functional layer, the functional layer is patterned by photolithography together with the resistor 30 and the first layer 41 into a planar shape as illustrated in FIG. 1.

In the present application, the functional layer refers to a layer having a function of promoting crystal growth of at least the resistor 30 as the upper layer. It is favorable that the functional layer further has a function of preventing oxidation of the resistor 30 due to oxygen and moisture contained in the substrate 10, and a function of improving the adhesion between the substrate 10 and the resistor 30. The functional layer may further have other functions.

The insulating resin film constituting the substrate 10 contains oxygen and moisture, and thereby, especially when the resistor 30 contains Cr, Cr forms a self-oxidized film; therefore, it is effective that the functional layer has a function of preventing oxidation of the resistor 30.

The material of the functional layer is not limited in particular as long as it has a function of promoting crystal growth of at least the resistor 30 as the upper layer, and can be appropriately selected depending on the purpose; as the material, one or more species of metals selected from among a group consisting of, for example, Cr (chromium), Ti (titanium), V (vanadium), Nb (niobium), Ta (tantalum), Ni (nickel), V (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium)), Os (osmium), Ir (iridium), Pt (platinum), Pd (palladium), Ag (silver), Au (gold), Co (cobalt), Mn (manganese), and Al (aluminum); an alloy of any of the metals in this group; or a compound of any of the metals in this group may be listed.

As examples of the alloys described above, FeCr, TiAl, FeNi, NiCr, CrCu, and the like may be listed. Also, as examples of the compounds described above, TiN, TaN, $Si_3N_4$, $TIO_2$, $Ta_2O_5$, $SiO_2$, and the like may be listed.

The functional layer can be formed by, for example, a conventional sputtering method using a material capable of forming the functional layer as a target, and introducing Ar (argon) gas into the chamber. By using the conventional sputtering method, the functional layer is formed as a film while the upper surface 10a of the substrate 10 is being etched with Ar; therefore, the effect of improving the adhesion can be obtained by minimizing the amount of the functional layer formed as a film.

However, this is an example of the method of forming a functional layer as a film, and the functional layer may be formed by another method. For example, a method may be used in which the upper surface 10a of the substrate 10 is activated by plasma treatment using Ar or the like before forming the functional layer so as to obtain an adhesion improving effect, and then, the functional layer is formed in vacuum as a film by a magnetron sputtering method.

The combination of the material, of the functional layer and the material of the resistor 30 and the first layer 41 is not limited in particular, and can be appropriately selected depending on the purpose; for example, it is possible to use Ti as the functional layer, and to form a Cr composite film containing α-Cr (alpha chromium) as the main component, as the resistor 30 and the first layer 41.

In this case, for example, the resistor 30 and the first layer 41 can be formed as a film by a magnetron sputtering method using a material capable of forming a Cr composite film as a target, and introducing Ar gas into the chamber. Alternatively, the resistor 30 and the first layer 41 may be formed as a film by a reactive sputtering method using pure Cr as a target, and introducing an appropriate amount of nitrogen gas together with Ar gas into the chamber.

In these methods, a growth face of the Cr composite film is defined and triggered by the functional layer formed of Ti, which enables to form a Cr composite film containing, as the main component, α-Cr having a stable crystal structure. Also, the gauge characteristics are improved by Ti constituting the functional layer diffusing into the Cr composite film. For example, the gauge factor of a sensor module included in the sensor module 5 can be greater than or equal to 10, and the temperature coefficient of gauge factor TCS and the temperature coefficient of resistance TCR can be fallen within a range of −1000 ppm/° C. to +1000 ppm/° C. Note that in the case where the functional layer is formed from Ti, the Cr composite film may contain Ti or TiN (titanium nitride).

Note that in the case where the resistor 30 is a Cr composite film, the functional layer made of Ti has all of the function of promoting the crystal growth of resistor 30; the function of preventing oxidation of the resistor 30 due to oxygen and moisture contained in the substrate 10; and the function of improving the adhesion between the substrate 10 and the resistor 30. The same applies in the case of using Ta, Si, Al, or Fe instead of Ti as the functional layer.

In this way, by providing a functional layer as the lower layer of the resistor 30, the crystal growth of the resistor 30 can be promoted, and the resistor 30 having a stable crystal phase can be manufactured. As a result, the stability of the gauge characteristics of the strain gauge included in the sensor module 5 can be improved. Also, by diffusing the material constituting the functional layer into the resistor 30, the gauge characteristics of the strain gauge included in the sensor module 5 can be improved.

After having the resistor 30 and the first layer 41 formed, a second layer 42 is layered on the first layer 41. The material and thickness of the second layer 42 are as described above. The second layer 42 can be formed by, for example, an electrolytic plating method or an electroless plating method.

Next, an electronic component 200 is mounted on a predetermined position of the upper surface 10a of the substrate 10 via an adhesive layer such as a die-attach film. Then, for example, by using wire bonding, the electrodes 200A of the electronic component 200 are electrically connected to the electrodes 40A via metal wires 210 such as gold wires or copper wires, and the electrodes 200B of the electronic component 200 are electrically connected to the electrodes 50A via metal wires 220 such as gold wires or copper wires.

Next, a cover layer 60 is formed on the upper surface 10a of the substrate 10, so as to cover the resistor 30, the wiring patterns 40, the electrodes 40A, the electronic component 200, the metal wires 210 and 220, the electrodes 50A, and the wiring patterns 50. The material and thickness of the cover layer 60 are as described above. The cover layer 60 can be manufactured, for example, by laminating a thermosetting insulating resin film in a semi-cured state on the upper surface 10a of the substrate 10, so as to cover the resistor 30, the wiring patterns 40, the electrodes 40A, the electronic component 200, the metal wires 210 and 220, the electrodes 50A, and the wiring patterns 50, and heating the laminated film to be cured. The cover layer 60 may also be manufactured by applying a liquid or paste-like thermosetting insulating resin to the upper surface 10a of the substrate 10, so as to cover the resistor 30, the wiring patterns 40, the electrodes 40A, the electronic component 200, the metal wires 210 and 220, the electrodes 50A, and the wiring patterns 50, and heating the resin to be cured.

Figure 3:
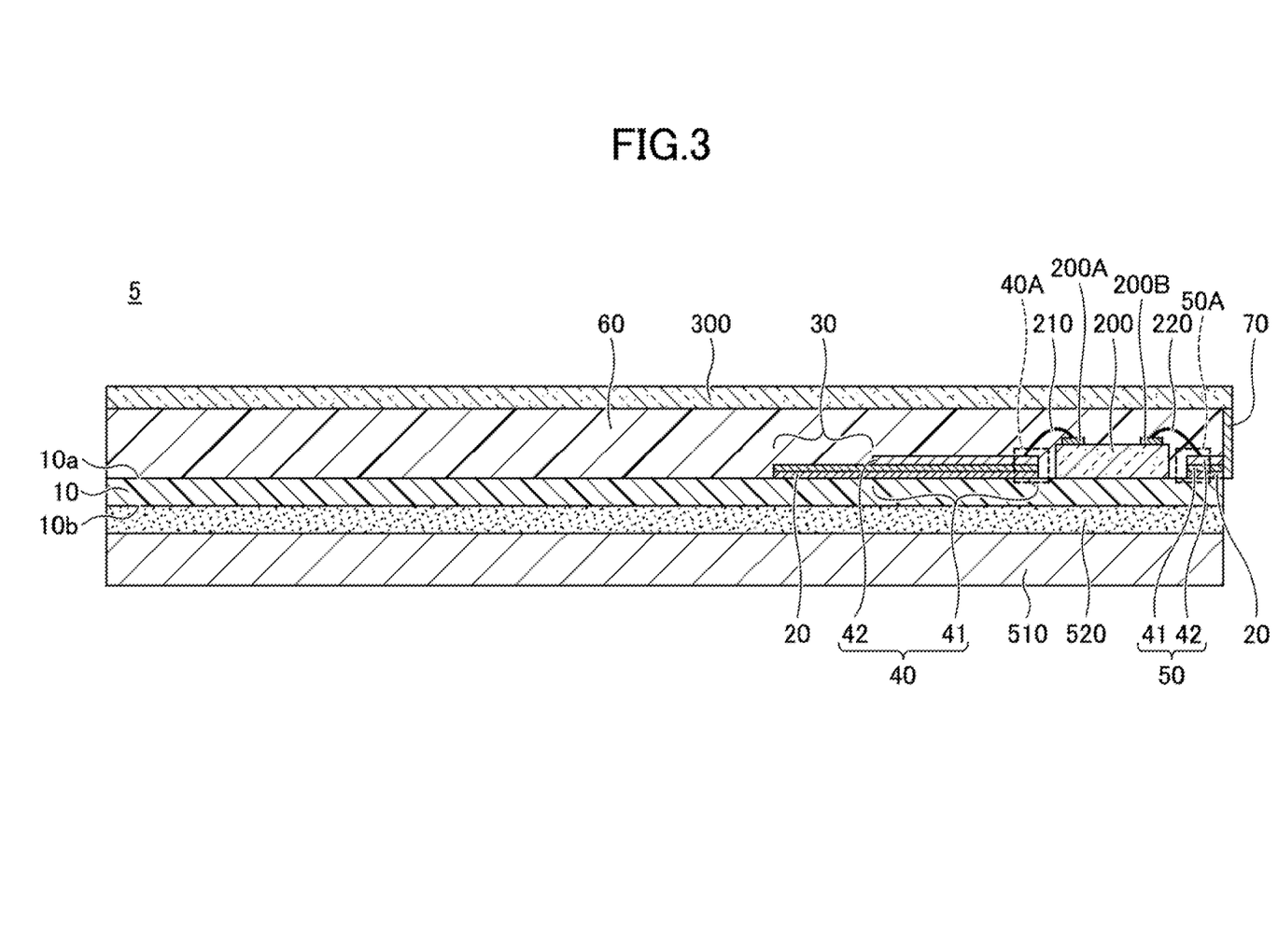
FIG. 3 is a second cross-sectional view illustrating a sensor module according to the first embodiment.

Note that in the case of providing a functional layer on the upper surface 10a of the substrate 10 as the underlayer of the resistor 30 and the first layer 41, the strain gauge 1 exhibits a cross-sectional shape as illustrated in FIG. 3. A layer indicated by a reference numeral 20 is the functional layer. The planar shape of the strain gauge 1 in the case of providing the functional layer 20 is substantially the same as that in FIG. 1.

Next, as the solar battery 300, for example, a flexible solar battery is provided and laminated on the upper surface of the cover layer 60. Then, by using a well-known wire forming method such as a subtractive method or a semi-additive method, wiring patterns 70 are formed on the side surface of the cover layer 60, and predetermined terminals of the solar battery 300 are electrically connected to the wiring patterns 50.

Next, the substrate 10 is attached to a strain generator 510. Specifically, for example, any one of the materials described above serving as a adhesive layer 520 is applied to, for example, the lower surface 10b of the substrate 10 and/or the upper surface of the strain generator 510. Then, the lower surface 10b of the substrate 10 is placed to face the upper surface of the strain generator 510, and the substrate 10 is arranged on the strain generator 510 having the applied material sandwiched in-between. Alternatively, a bonding sheet may be sandwiched between the strain generator 510 and the substrate 10.

Next, the substrate 10 is heated up to a predetermined temperature while being pressed against the strain generator 510, and the applied material is cured to form the adhesive layer 520. This makes the upper surface of the strain generator 510 adhered to the lower surface 10b of the substrate 10 via the adhesive layer 520, and the sensor module 5 is completed. The sensor module 5 can be applied to, for example, measurement of load, pressure, torque, acceleration, and the like.

Note that in the manufacturing steps of the sensor module 5, the solar battery 300 may be laminated onto the upper surface of the cover layer 60, after the substrate 10 is attached to the strain generator 510.

In this way, in the sensor module 5, the substrate 10 is provided with the resistor 30, the electronic component 200 electrically connected to the resistor 30, and the solar battery 300 as the power source that supplies power to the electronic component 200. With this structure, it is possible to implement a small sensor module that does not require an external power supply.

In the sensor module 5, by making the resistor 30 as a thin film, the power consumption and size of the sensor module 5 can be reduced in particular.

In other words, in the case of using as the material of the resistor 30, for example, foil of Cu—Ni or Ni—Cr, the resistance value of the resistor 30 is around 1 kΩ, whereas in the case of using a Cr composite film made as a thin film as the material of the resistor 30, the resistance value of the resistor 30 being greater than or equal to 5 kΩ can be obtained. Therefore, in the case of using such a Cr composite film as the material of the resistor 30, the current flowing in the resistor 30 is reduced, and thereby, lower power consumption can be achieved. Further, the lower power consumption reduces the current supplied from a solar battery 300; therefore, it is possible to use a solar battery 300 having a smaller size, and thereby, to reduce the overall size of the sensor module 5.

Modified Example 1 of the First Embodiments

In a modified example 1 of the first embodiment, an example of a sensor module will be presented that has the solar battery mounted on the lower surface of the substrate. Note that in the modified example 1 of the first embodiment, description of the same components as those already described may be omitted.

Figure 4:
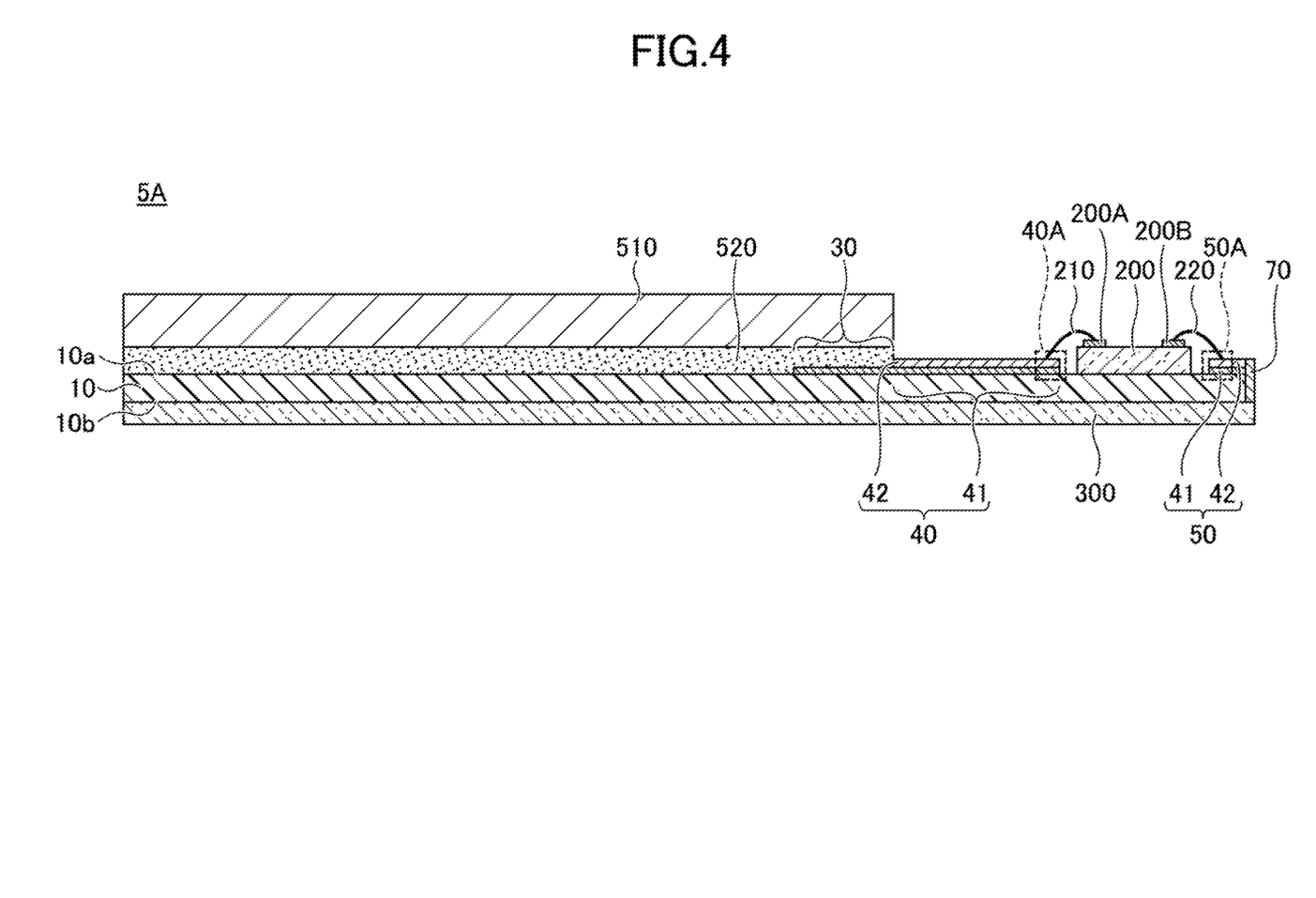
FIG. 4 is a cross-sectional view illustrating a sensor module according to a modified example 1 of the first embodiment.

FIG. 4 is a cross-sectional view illustrating a sensor module according to the modified example 1 of the first embodiment, which illustrates a cross section corresponding to FIG. 2.

Referring to FIG. 4, in the sensor module 5A, the solar battery 300 is mounted on the upper surface 10b of the substrate 10. Specifically, the solar battery 300 is directly arranged on the lower surface 10b of the substrate 10, and electrically connected to the wiring patterns 50 via the wiring patterns 70 provided on the side surface of the substrate 10.

Note that direct arrangement herein means that no other components such as the cover layer 60 and the strain generator 510 are interposed between the solar battery 300 and the substrate 10, although the direct arrangement allows the presence of an intervening adhesive or adhesive sheet between the solar battery 300 and the substrate 10 to secure the solar battery 300 to the substrate 10.

Also, the strain generator 510 is secured on the upper surface 10a of the substrate 10 via the adhesive layer 520, so as to cover the resistor 30, and to expose the wiring patterns 40, the electrodes 40A, the electronic component 200, the metal wires 210 and 220, the electrodes 50A, and the wiring patterns 50.

In the sensor module 5A, a cover layer may be provided on the upper surface 10a of the substrate 10, so as to cover the wiring patterns 40, the electrodes 40A, the electronic component 200, the metal wires 210 and 220, the electrodes 50A, and the wiring patterns 50.

In this way, in the sensor module, the position to arrange the solar battery is not limited in particular, and may be arranged on the upper surface 10a of the substrate 10 on which the resistor 30 is provided, or may be arranged on the lower surface 10b on which the resistor 30 is not provided.

Modified Example 2 of the First Embodiment

In a modified example 2 of the first embodiment, another example of a sensor module will be presented that has the solar battery mounted on the lower surface of the substrate. Note that in the modified example 2 of the f first embodiment, description of the same components as those already described may be omitted.

Figure 5:
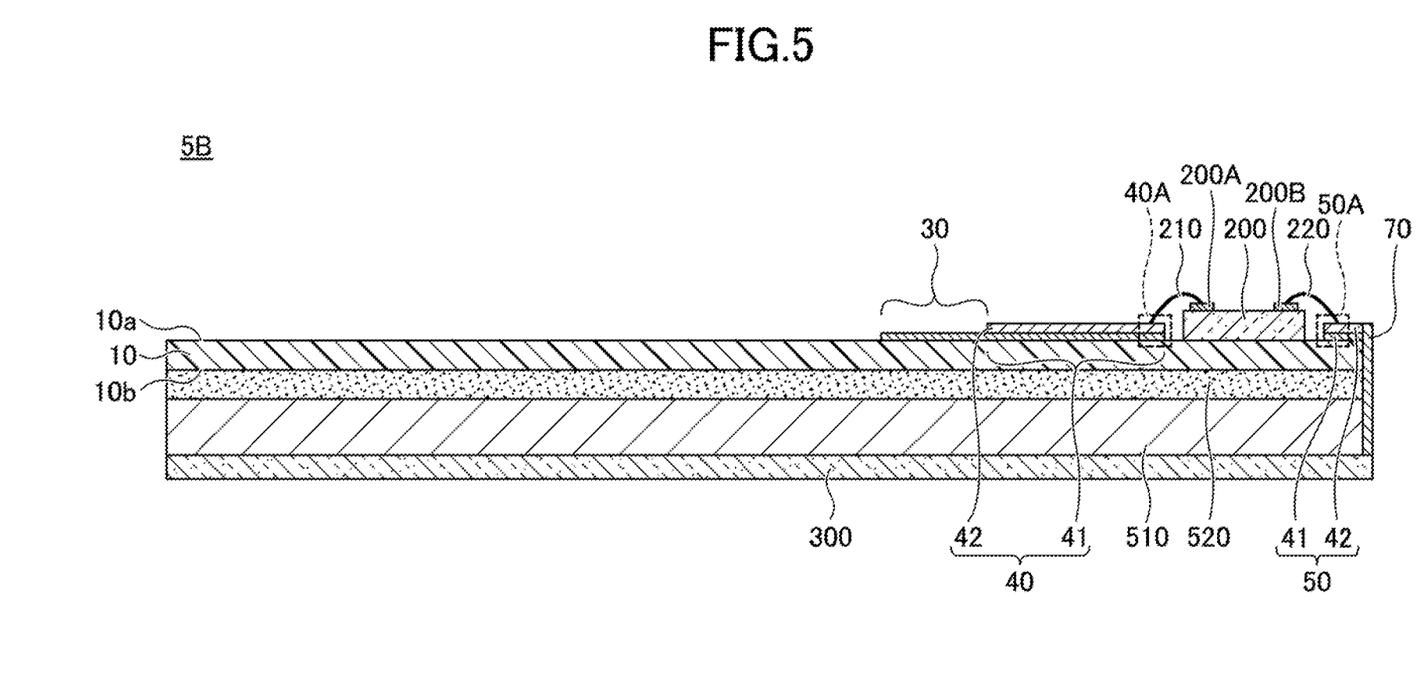
FIG. 5 is a cross-sectional view illustrating a sensor module according to the modified example 2 of the first embodiment.

FIG. 5 is a cross-sectional view illustrating a sensor module according to the modified example 2 of the first embodiment, which illustrates a cross section corresponding to FIG. 2.

Referring to FIG. 5, in a sensor module 5B, the solar battery 300 is mounted on the upper surface 10b of the substrate 10. Specifically, the strain generator 510 is secured on the lower surface 10b of the substrate 10 via the adhesive layer 520, and the solar battery 300 is arranged on the lower surface of the strain generator 510. In addition, the solar battery 300 is electrically connected to the wiring patterns 50 via the wiring patterns 70 that are provided on the respective side surfaces of the substrate 10, the adhesive layer 520, and the strain generator 510.

In the sensor module 5B, a cover layer may be provided on the upper surface 10a of the substrate 10, so as to cover the resistor 30, the wiring patterns 40, the electrodes 40A, the electronic component 200, the metal wires 210 and 220, the electrodes 50A, and the wiring patterns 50.

In this way, in the sensor module, the position to arrange the solar battery is not limited in particular, and may be arranged on the upper surface 10a of the substrate 10 on which the resistor 30 is provided, or may be arranged on the lower surface 10b on which the resistor 30 is not provided via the strain generator 510 and the adhesive layer 520.

Modified Example 3 of the First Embodiment

In a modified example 3 of the first embodiment, an example of a sensor module will be presented that has a protective layer provided on the solar battery. Note that in the modified example 3 of the first embodiment, description of the same components as those already described may be omitted.

Figure 6:
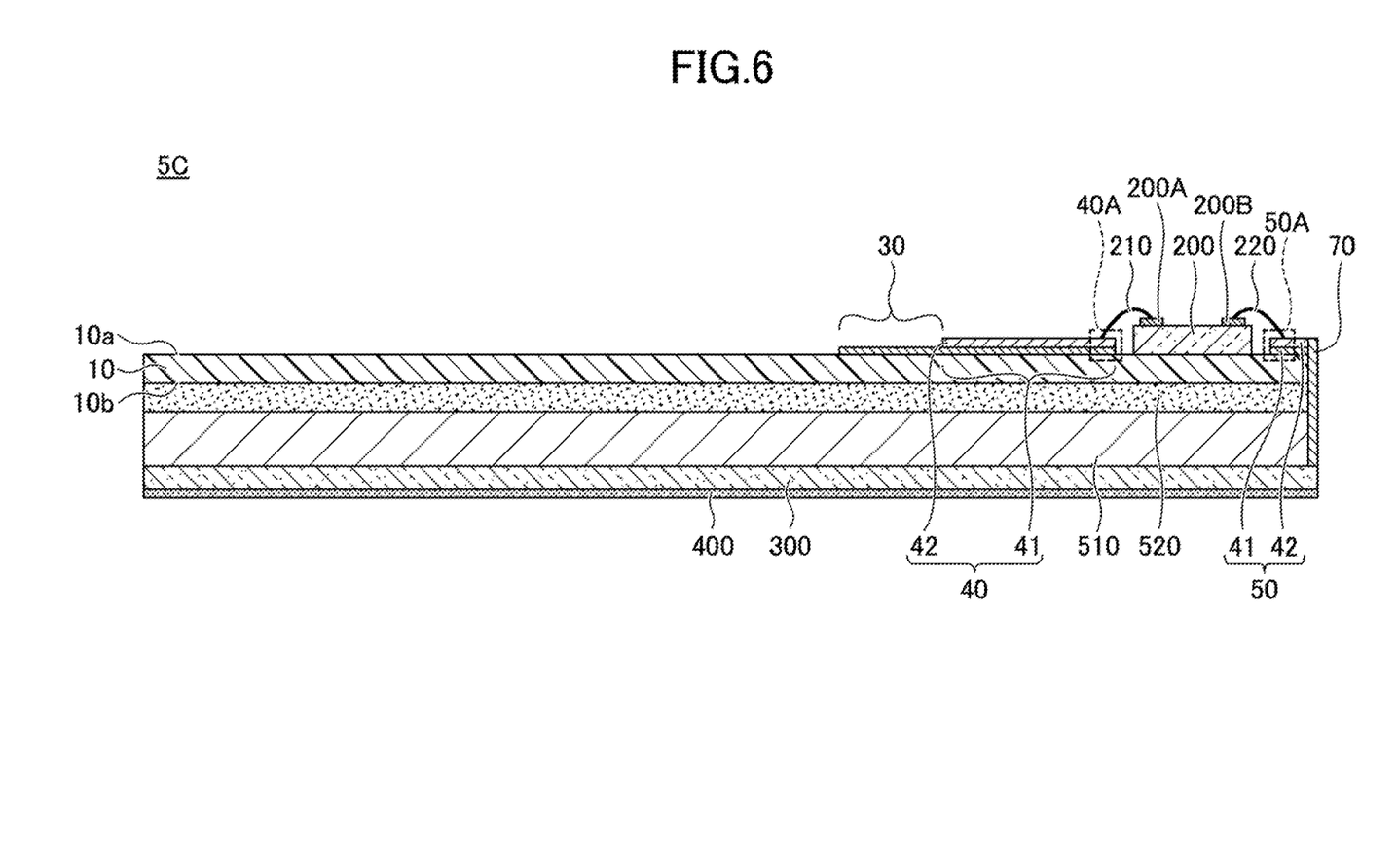
FIG. 6 is a cross-sectional view illustrating a sensor module according to a modified example 3 of the first embodiment.

FIG. 6 is a cross-sectional view illustrating a sensor module according to the modified example 3 of the first embodiment, which illustrates a cross section corresponding to FIG. 2.

Referring to FIG. 6, a sensor module 5C has a protective layer 400 provided on the light-receiving surface of the solar battery 300, and in this regard, differs from the sensor module 5B (see FIG. 5).

In the sensor module 50, a cover layer may be provided on the upper surface 10a of the substrate 10, so as to cover the resistor 30, the wiring patterns 40, the electrodes 40A, the electronic component 200, the metal wires 210 and 220, the electrodes 50A, and the wiring patterns 50.

The protective layer 400 is formed by applying antifouling and defogging treatments (silicone and fluorine-based treatments) or a photocatalytic material ($TiO_2$, and the like) to the light-receiving surface of the solar battery 300, and is configured to transmit light having wavelengths to be received by the solar battery 300. By providing the protective layer 400 on the light-receiving surface of the solar battery 300, it is possible to maintain the power generation efficiency of the solar battery 300.

Note that the protective layer 400 can also be applied to the sensor modules 5, 5A, and 5B described above, and to sensor modules 5D, 5E, and 5F, which will be described later, and in these cases, substantially the same effect as described above can be brought.

Modified Example 4 of the First Embodiment

In a modified example 4 of the first embodiment, an example of a sensor module will be presented that has the solar battery mounted on the upper surface of the substrate. Note that in the modified example 4 of the first embodiment, description of the same components as those already described may be omitted.

Figure 7:
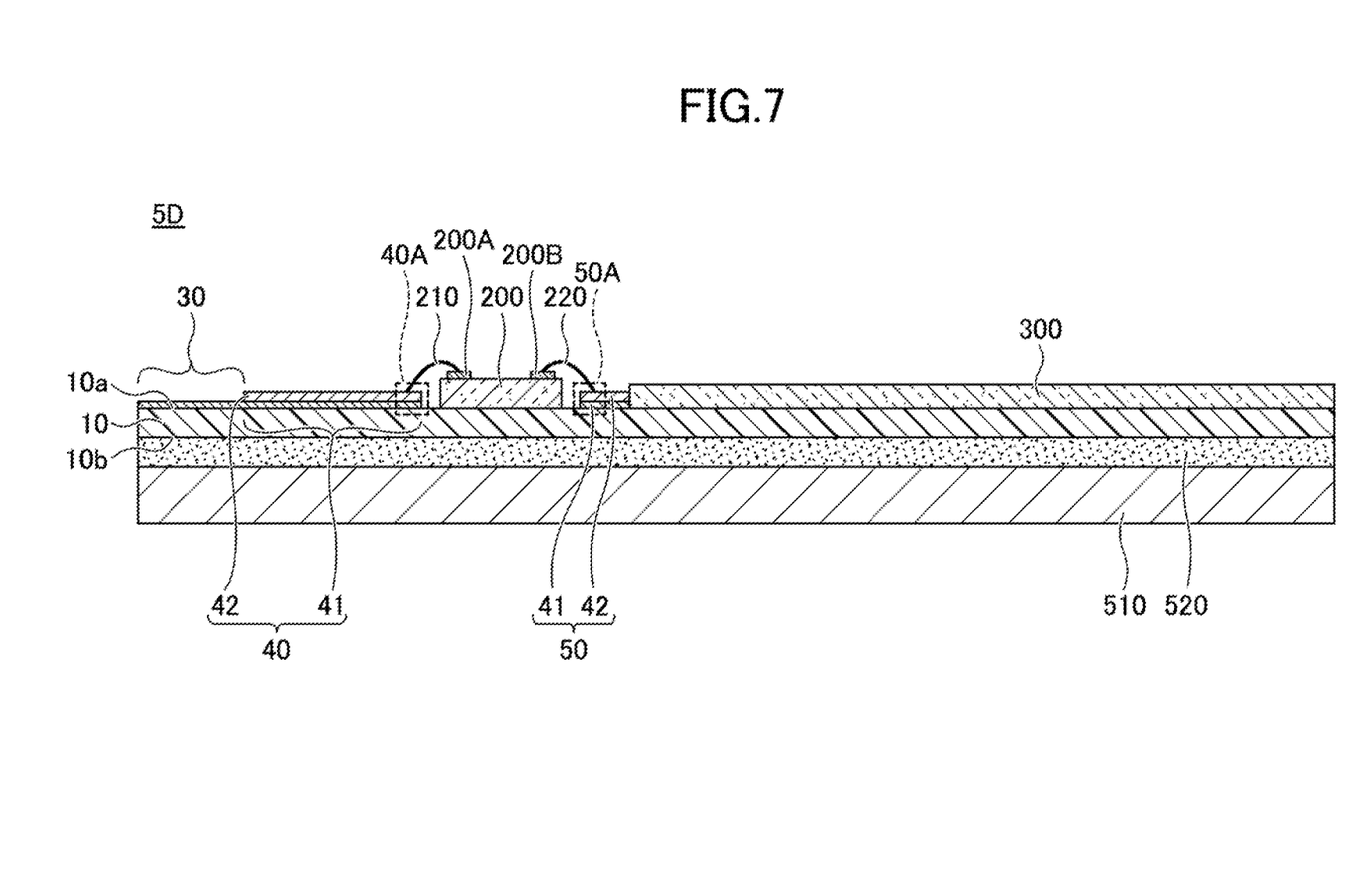
FIG. 7 is a cross-sectional view illustrating a sensor module according to a modified example 4 of the first embodiment.

FIG. 7 is a cross-sectional view illustrating a sensor module according to the modified example 4 of the first embodiment, which illustrates a cross section corresponding to FIG. 2.

Referring to FIG. 7, in a sensor module 5D, the solar battery 300 is mounted on the upper surface 10a of the substrate 10. Specifically, the solar battery 300 is directly arranged on the upper surface 10a of the substrate 10, and electrically connected to the wiring patterns 50. Note that the meaning of direct arrangement is as described above.

In the sensor module 5D, a cover layer may be provided on the upper surface 10a of the substrate 10, so as to cover the resistor 30, the wiring patterns 40, the electrodes 40A, the electronic component 200, the metal wires 210 and 220, the electrodes 50A, and the wiring patterns 50.

In this way, in the sensor module, the position to arrange the solar battery is not limited in particular, and may be directly arranged on the upper surface 10a of the substrate 10 on which the resistor 30 is provided.

Modified Example 5 of the First Embodiment

In a modified example 5 of the first embodiment, an example of a sensor module will be presented that includes multiple instances of the resistor electrically connected to the electronic component. Note that in the modified example 5 of the first embodiment, description of the same components as those already described may be omitted.

Figure 8:
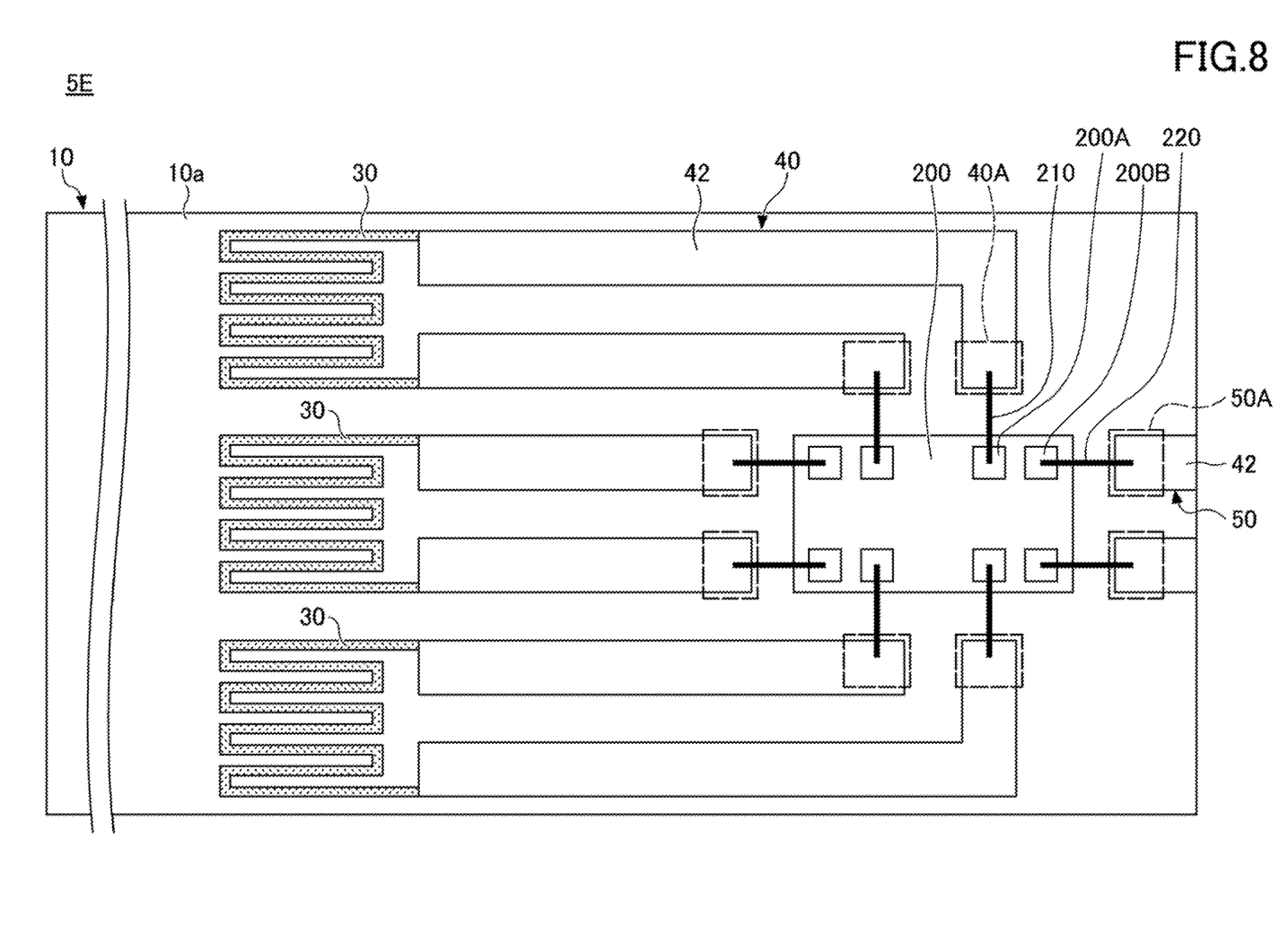
FIG. 8 is a first partial plan view illustrating a sensor module according to a modified example 5 of the first embodiment.

FIG. 8 is a cross-sectional view illustrating a sensor module according to the modified example 5 of the first embodiment. Similar to FIG. 1, FIG. 8 is an enlarged view of the vicinity of an electronic component 200 and resistors 30, in which illustration of a cover layer 60, wiring patterns 70, and a solar battery 300 is omitted.

The cross-sectional structure of the sensor module according to the modified example 5 of the first embodiment is substantially the same as that illustrated in FIG. 2; therefore, illustration of the cross-sectional view is omitted; however, note that the cover layer; 60 is provided on the upper surface 10a of the substrate 10, so as to cover the resistor 30, the wiring patterns 40, the electrodes 40A, the electronic component 200, the metal wires 210 and 220, the electrodes 50A, and the wiring patterns 50. In addition, the solar battery 300 is arranged on the upper surface of the cover layer 60, and electrically connected to the wiring patterns 50 via the wiring patterns 70 that are provided on the side surface of the cover layer 60.

Referring to FIG. 8, a sensor module 5E has multiple sets of the resistors 30, wiring patterns 40, and electrodes 40A, and in this regard, differs from the sensor module 5 (see FIGS. 1 and 2).

The electronic component 200 is, for example, a semiconductor chip that performs amplification of an electric signal input from the resistor 30 via the wiring patterns 40 and the electrodes 40A; and temperature correction, and has a function of independently processing electric signals input from the multiple resistors 30. A passive component such as a capacitor may be mounted together with the semiconductor chip.

Each electrode 200A of the electronic component 200 is electrically connected to an electrode 40A of a corresponding set via a metal wire 210 such as a gold wire or a copper wire. The electrodes 200A and the electrodes 40A can be connected by, for example, wire bonding.

However, electronic components may be individually mounted for the respective sets of the resistors 30, the wiring patterns 40, and the electrodes 40A.

Also, in the example in FIG. 8, the sensor nodule 5E includes three sets of resistors 30, wiring patterns 40, and electrodes 40A, but is not limited as such; a sensor module according to the present embodiment may include two sets of resistors 30, wiring patterns 40, and electrodes 40A, or may include four sets or more. Also, the number of resistors 30 do not need to be equivalent, to the number of electrodes 40A.

Figure 9:
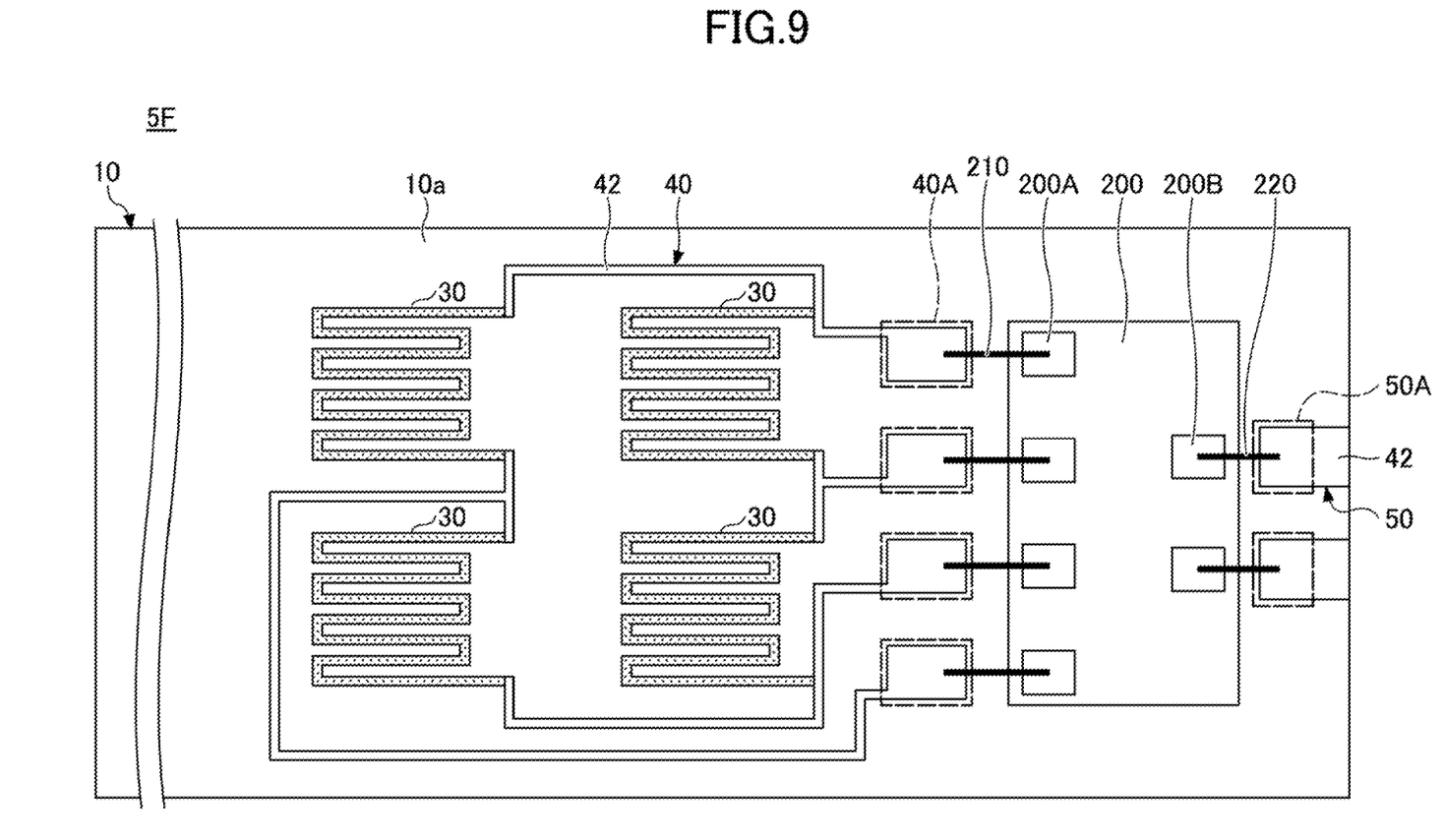
FIG. 9 is a second partial plan view illustrating a sensor module according to a modified example 5 of the first embodiment.

For example, like a sensor nodule 5F illustrated in FIG. 9, four resistors 30 may be connected by wiring patterns 40 to form a Wheatstone bridge circuit. In this case, four connection points of any two resistors 30 are connected to the electrodes 40A via the wiring patterns 40, respectively. Note that the grid direction of each resistor 30 in FIG. 9 is an example, and is not limited as such.

In this way, in the sensor module 5E and 5F, on the upper surface 10a of the single substrate 10, multiple sets of resistors 30, wiring patterns 40, and electrodes 40A, and electronic components 200 are provided. With this structure, it is possible to implement small sensor modules 5E and 5F that are capable of detecting distortion in multiple regions. The other effects are substantially the same as in the first embodiment.

Note that in the sensor modules 5A, 5B, 5C, and 5D described earlier, as in the sensor modules 5E and 5F, it is possible to provide multiple sets of resistors 30, wiring patterns 40, and electrodes 40A; and an electronic components 200, on the upper surface 10a of the single substrate 10. Also in these cases, it is possible to implement a small sensor module that is capable of detecting distortion in multiple regions.

As above, the preferred embodiments and the like have been described in detail; note that the present invention is not limited to the embodiments described above and the like, and various modifications and substitutions can be made to the embodiments and the like described above without departing from the scope described in the claims.

For example, in the first embodiment and its modifier examples, as the power source, instead of the solar battery, a small battery (such as a lithium-ion battery) may be used.

Also, in the first embodiment and its modifier examples, although examples have been presented in which a flexible solar battery is laminated, the solar battery may be produced by sequentially laminating a first electrode layer, a power generation layer, a second electrode layer, or the like on a substrate, a cover layer, and the like by using, for example, evaporation or sputtering.

The present international application claims priority based on Japanese Patent Application No. 2018-008379 filed on Jan. 22, 2018, and the entire contents of Japanese Patent Application No. 2018-008379 are incorporated herein by reference.

DESCRIPTION OF REFERENCE CODES 5, 5A, 5B, 5C, 5C, 5E, 5F sensor module
10 substrate
10a upper surface
10b lower surface
20 functional layer
30 resistor
40, 50 wiring pattern
40A, 50A, 200A, 200B electrode
41 first layer
42 second layer
60 cover layer
200 electronic component
210, 220 metal wire
300 solar battery
400 protective layer
510 strain generator
520 adhesive layer

The invention claimed is:

1. A sensor module comprising:
a substrate;
a resistor formed of a film containing, Cr, CrN, and Cr2N, on one surface of the substrate;
an electronic component mounted on the one surface of the substrate, to be electrically connected to the resistor; and
a power source mounted on the one surface of the substrate or on another surface of the substrate, to be electrically connected to the electronic component, to supply power to the electronic component.

2. The sensor module as claimed in claim 1, wherein the power source is directly arranged on the one surface of the substrate.

3. The sensor module as claimed in claim 1, further comprising:
an insulating resin layer on the one surface of the substrate, to cover the resistor and the electronic component,
wherein the power source is arranged on a surface on an opposite side with respect to the substrate of the insulating resin layer.

4. The sensor module as claimed in claim 1, wherein the power source is directly arranged on said another surface of the substrate.

5. The sensor module as claimed in claim 1, further comprising:
a strain generator secured to said another surface of the substrate via an adhesive layer,
wherein the power source is arranged on a surface on an opposite side with respect to the adhesive layer of the strain generator.

6. The sensor module as claimed in claim 1, wherein the power source is a solar battery.

7. The sensor module as claimed in claim 6, wherein a protective layer is provided on a light-receiving surface of the solar battery.

8. The sensor module as claimed in claim 1, further comprising:
multiple instances of the resistor electrically connected to the electronic component, on the substrate.

9. The sensor module as claimed in claim 1, wherein the substrate is made of resin.

10. The sensor module as claimed in claim 9, further comprising:
a functional layer formed of a metal, alloy, or metal compound, directly on the one surface of the substrate,
wherein the resistor is formed on one surface of the functional layer.

11. The sensor module as claimed in claim 10, wherein the functional layer includes
a function of promoting crystal growth of the resistor,
a function of preventing oxidation of the resistor,
a function of controlling movement of oxygen and moisture contained in the substrate toward the resistor, and/or
a function of improving adhesion between the substrate and the resistor.

12. A sensor module comprising:
a substrate;
a resistor formed of a material containing at least one of chromium and nickel, on one surface of the substrate;
an electronic component mounted on the one surface of the substrate, to be electrically connected to the resistor; and
a power source mounted on the one surface of the substrate or on another surface of the substrate, to be electrically connected to the electronic component, to supply power to the electronic component,
wherein the power source is arranged on a side opposite to the electronic component with an insulating layer sandwiched in-between, and
wherein the electronic component is electrically connected to the power source via a wiring pattern provided on a side surface of the insulating layer.

13. The sensor module as claimed in claim 12, wherein the insulating layer corresponds to the substrate.

14. The sensor module as claimed in claim 12, wherein the insulating layer is an insulating resin layer covering the electronic component.

15. The sensor module as claimed in claim 12, wherein the resistor is formed of a film containing, Cr, CrN, and Cr2N.

\* \* \* \* \*